United States Patent [19]

Cartier et al.

[11] E Re. 29,158

[45] Reissued Mar. 22, 1977

[54] TIMER BLADE ARRANGEMENT

[75] Inventors: Roger J. Cartier, Hoffman Estates; George Obermann, Niles; John Willigman, Elk Grove Village, all of Ill.

[73] Assignee: The Singer Company, New York, N.Y.

[22] Filed: Feb. 10, 1975

[21] Appl. No.: 548,201

Related U.S. Patent Documents

Reissue of:

[64] Patent No.: 3,752,944
Issued: Aug. 14, 1973
Appl. No.: 194,184
Filed: Nov. 1, 1971

[52] U.S. Cl. ..... 200/38 B; 200/27 B; 200/283

[51] Int. Cl.[2] ..... H01H 3/42

[58] Field of Search ..... 200/38 B, 38 BA, 38 C, 200/38 CA, 27, 153 LB, 283

[56] References Cited

UNITED STATES PATENTS

| | | | |
|---|---|---|---|
| 3,118,982 | 1/1964 | Pulley | 200/38 BA |
| 3,221,116 | 11/1965 | McAllister | 200/27 |
| 3,472,976 | 10/1969 | Hunt | 200/38 B |
| 3,478,181 | 11/1969 | Buckeridge et al. | 200/38 B |
| 3,679,988 | 7/1972 | Haydon | 200/38 B X |

FOREIGN PATENTS OR APPLICATIONS

| | | | |
|---|---|---|---|
| 712,156 | 7/1954 | United Kingdom | 200/38 B |

*Primary Examiner*—Herman Hohauser
*Attorney, Agent, or Firm*—Michael, Best & Friedrich

[57] ABSTRACT

The timer has switches including upper and lower passive blades and an active blade therebetween. The distal end of the lower passive blade has depending spacers which straddle the cam upon which the follower on the distal end of the active blade rides. The spacers reference the lower passive blade off the hub of the drum type program cam. The lower passive blade is provided with a rest or stop for the upper passive blade limiting downward movement of that blade. With precision molding, both passive blades are accurately referenced from the cam hub and the location of the follower which actuates the active blade is precisely located. Accuracy of switching is increased without increased precision in manufacture. Use of two cam tracks permits simultaneous actuation of the active and "passive" blades to effect faster switching. It is possible to provide a "make-make" arrangement instead of the double throw arrangement.

17 Claims, 11 Drawing Figures

TIMER BLADE ARRANGEMENT

Matter enclosed in heavy brackets [ ] appears in the original patent but forms no part of this reissue specification; matter printed in italics indicates the additions made by reissue.

BACKGROUND OF THE INVENTION

In U.S. Pat. No. 3,431,372 there is shown a timer which provided for a new way of mounting the switches which are actuated by the timing cam. This arrangement permitted increased accuracy in switching without any need for adjustment after assembly. In this arrangement three wafers in which the switch blades are molded are stacked and any interconnecting between the blades is accomplished by bussing between the various layers. This construction also provided for terminating the switch terminals in two groups, both of which faced the same direction and each of which permitted plug-in type connectors to be used. The distal ends of the passive blades were referenced by means of a guide block held between the end plates of the timer. The guide block also received Teflon coated steel followers which, by reason of the positioning of the guide block, where quite accurately located on the projected diameter of the timing cam. The active blade end projected into the follower and accurate switching was thus attained.

SUMMARY OF THE INVENTION

The construction of FIGS. 1–5 improves over the patented construction just described by way of eliminating the guide block and the separate follower. By molding parts on the ends of the blades, positive location of the blades with respect to each other and with respect to the cam is insured. The lower passive blade has spacers which are referenced relative to the cam hub and thus accommodate any run-out in the hub shape without adversely affecting precision of switching. This eliminiates tolerance problems encountered in the prior construction. The construction also increases the accuracy of switching without increasing the precision of manufacture necessary to attain this increased accuracy. Furthermore, the friction of the follower in the guide block in the prior construction has been eliminated and, hence, the torque requirement to turn the cam is reduced to one half.

The construction incorporates integral electrical barriers on the blade assemblies to minimize the risk of arcing between adjacent blades. All of this has been attained with cost reduction in manufacture and in assembly. A further advantage of the increased accuracy of switching resides in the fact the step (angle of rotation) for a given size cam drum can be reduced, thus making more steps available and, hence, more program information possible or, on the other side, the angular step can be maintained as in the past but the drum diameter and, hence, size of the overall timer can be reduced.

The basic construction is readily adapted to "flat" timers as shown in FIGS. 6 and 7 while retaining the advantages already mentioned. Further, by providing two cam tracks whereby the "passive" blades are also actuated as in FIG. 8 the switching time can be made shorter and permit application to "creep" type timers having flat cam or drum configuration. The make-make arrangement can readily be incorporated in any of the foregoing.

DESCRIPTION OF PREFERRED EMBODIMENTS

Figure 1:
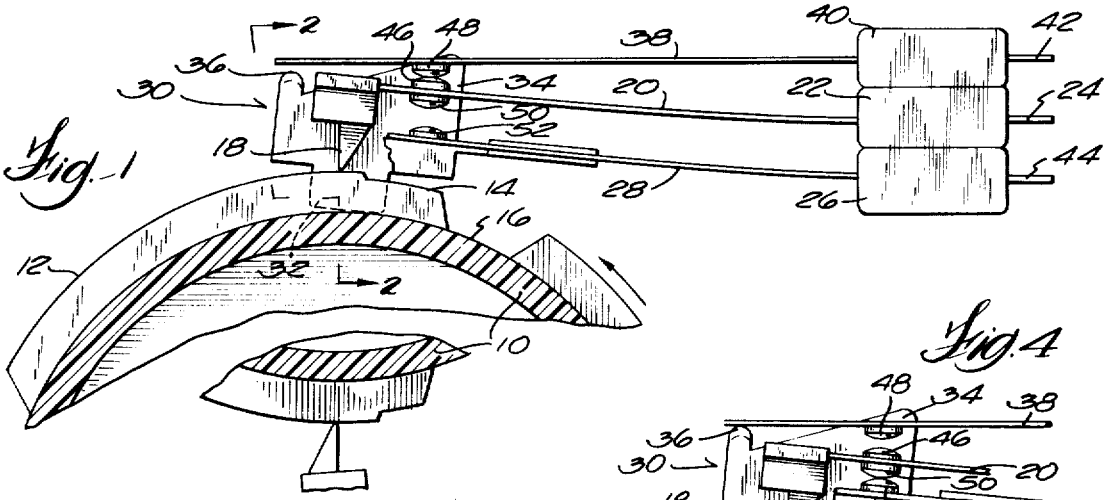
FIG. 1 shows in fragmentary form portions of a timer having a program cam operating the switches in radially opposed positions.

The program cam drum 10 is located between the timer end plates for rotation in a counterclockwise direction as viewed in FIG. 1. In the foreground of FIG. 1 a cam has a maximum elevation portion 12, a mid portion 14 and a low portion 16. The switch actuated by this cam has a plastic follower 18 molded on the distal end of active blade 20, the proximal end of which is embedded in a wafer 22 with the end of the blade projecting to provide a terminal 24. The molded wafer 22 is the middle wafer of the three stacked wafers. The bottom wafer 26 embeds passive blade 28 which has a molded assembly 30 on its distal end. One portion of this assembly constitutes a pair of depending spacers 32,32 which ride on the hub or inter-cam space of the cam drum 10 so as to straddle the cam 12,14,16 against which follower 18 is self-biased. The assembly 30 also includes an electrical barrier 34 projecting upwardly at one side of the assembly to increase the effective spacing between adjacent switch assemblies to minimize arcing between adjacent switches. The assembly 30 also includes a rest or stop 36 which limits the downward travel of the upper passive blade 38 which is embedded in the upper wafer 40 with its end also projecting to form a terminal 42. The lower passive blade also runs through the wafer to provide a terminal 44.

Figure 4:
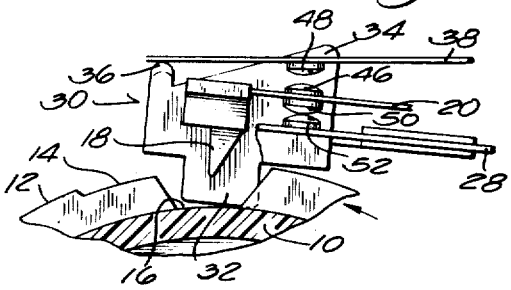
FIG. 4 is similar to FIG. 3 but shows the active blade closed on the lower passive blade.
Figure 3:
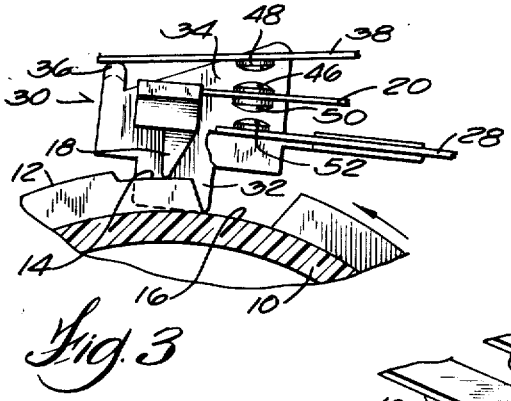
FIG. 3 is similar to a portion of FIG. 1 but illustrates the active blade in the mid position, that is with no circuit closed.

In the upper portion of FIG. 1 the follower 18 is riding on the highest portion 12 of the cam so as to lift the active blade and bring its contact 46 into engagement with the contact 48 carried by the upper passive blade. The high portion of the cam 12 is selected so as to lift the distal end of the upper blade 38 off of stop 36 (against its self-bias) to insure good contact pressure. When the cam is indexed a bit further to the position shown in FIG. 3, the follower drops down to the mid portion 14 of the cam and at this point the distal end of the upper blade 38 rests on stop 36 and contact 46 on the active blade has moved away from contact 48 on the upper passive blade while contact 50 on the active blade has not moved down far enough to engage the contact 52 on the lower blade. Therefore, the circuits are open in this position. A little further travel of the cam drum to the position shown in FIG. 4 will allow the active blade to closely approach the low portion 16 in which position the active blade contact 50 engages contact 52 on the lower passive blade closing that circuit. Downward movement of the lower blade is prevented by the spacers and contact pressure is obtained by the self-bias of the active blade against the lower blade.

Since the spacers 32 on the molded assembly 30 function to position the end of the lower blade and also provide the stop for the upper blade and, hence, determine the minimum spacing between contacts 48 and 52 on the upper and lower blades, respectively, accuracy is assured in this portion. The molded tip including the follower 18 on the active blade is accurately located and since all of the wafers are stacked and this locates the root or proximal ends of the blades, accuracy is insured simply by proper mounting of the stacked wafers between the timer end plates. Thus it is only necessary to locate the wafers with some degree of precision and the follower will then be in the proper location and must be properly located relative to the passive blades.

It will be noted that the generally diametrically oriented surface of the follower 18 is on what might be termed the trailing side of the follower with respect to the direction of rotation of the cam drum. In the lower portion of FIG. 1 it will be noted that this condition is still true and, hence, the upper and lower switches have differently shaped followers relative to the overall assembly. This is to insure proper tracking on the cam surfaces.

Figure 2:
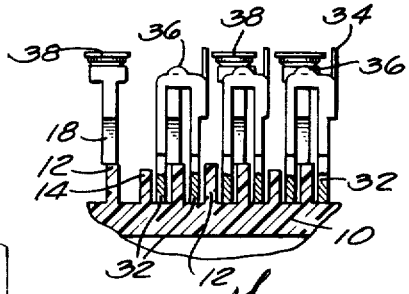
FIG. 2 is an end view as indicated in FIG. 1 showing the manner in which the spacers on the distal end of the blades straddle the cams operating the switches.
Figure 5:
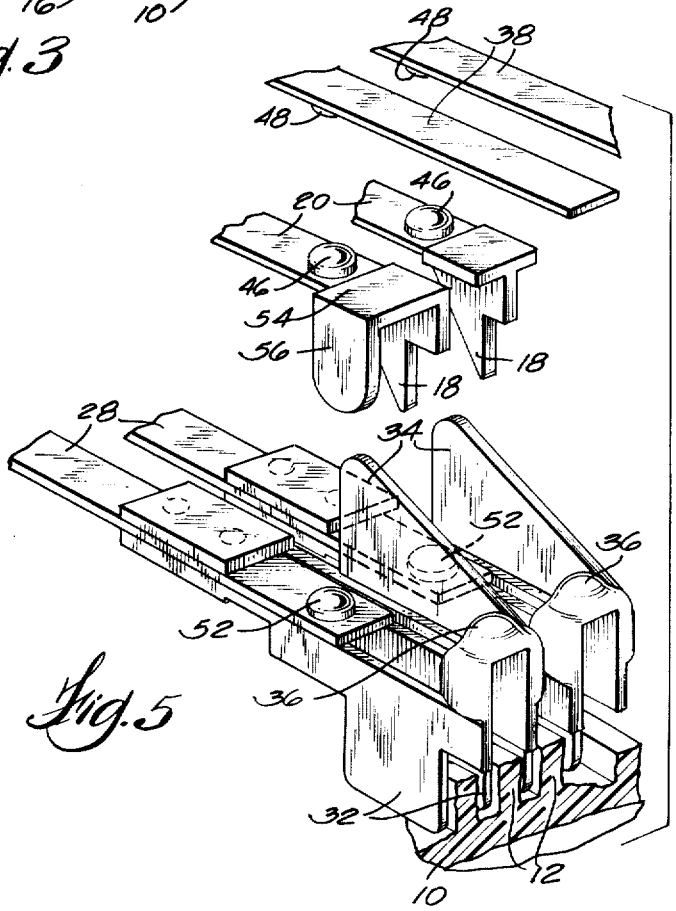
FIG. 5 is an exploded perspective view partly in section further illustrating the construction.

As can be seen in FIGS. 2 and 5, the blades in the upper assembly (the same is true in the lower assembly) operate on alternate cam tracks with the opposed assembly of switches on the other side of the cam drum being operated by the other cams. Since the spacers reference off the cam hub, any run-out in the cam circumference is automatically compensated and will not affect switching accuracy. It will be noted, particularly in FIG. 2, that the spacing between the spacers and the cam is such that it is not possible to orient the blades relative to the cam upon which they are to operate in such a way that the follower would "miss" the cam, that is,...fall between the cam and an adjacent spacer. The active blade molded follower and the assembly on the lower passive blade are preferably self-lubricating plastic such as Nylon or filled Nylon. Due to this factor and the elimination of the friction of the followers in the guide blocks as in the aforesaid patent, the torque required to rotate this assembly is about one half that found in the patent structure.

In FIG. 5 an additional feature may be noted (it should be noted that this figure has no particular reference to the others, being representative only) in that the active blade in the left of the figure is provided with a laterally projecting arm 54 which includes a depending finger 56. This permits this blade to operate or be operated by a lever which is, in turn, operated by a subinterval cam. For example, this can interconnect a subinterval cam (old in the art) so as to determine when the subinterval switch is effective in conjunction with the program cam.

It will be appreciated that not all switches operated by the program cam need be double acting. Thus in some cases the upper passive blade can be omitted.

Figure 6:
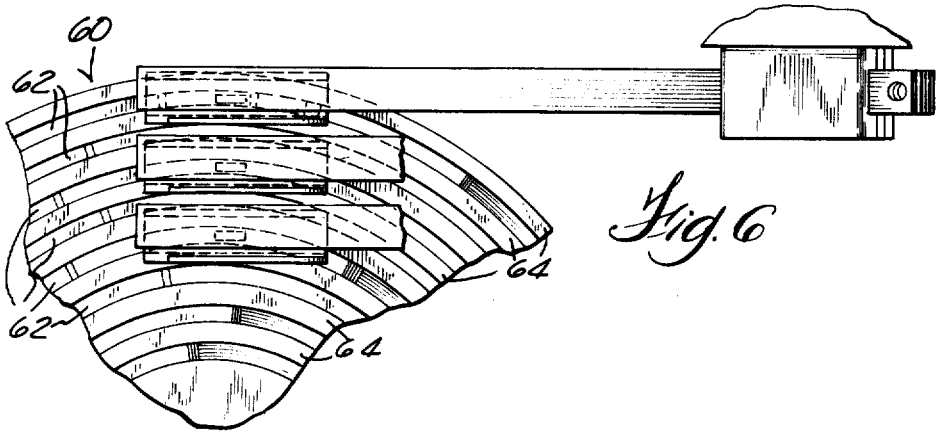
FIG. 6 is a simplified plan view showing application of the concept to a flat program cam.
Figure 7:
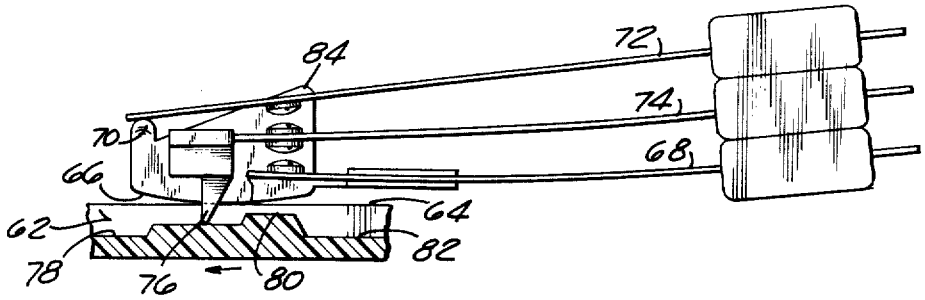
FIG. 7 is a simplified fragmentary view showing the preferred manner of application to the flat cam in FIG. 6.

FIGS. 6 and 7 illustrate the adaptation of this concept to a flat program cam or face cam 60 having radially spaced recessed cam tracks 62. The switches are positioned in this instance in a generally tangential relationship to the cam tracks with the actuation points lying on the radius in the interest of accuracy. The passive blades are reference relative to the smooth surface 64 between the recessed cam tracks or grooves. Thus the spacer 66 molded on the end of the lower passive blade 68 has a rounded bottom designed to contact and ride on the smooth inter-cam surface 64. The spacer includes the upwardly projecting finger portion 70 against which the upper passive blade 72 may rest when it is not being contacted by the active blade 74. The active blade is provided with a follower 76 which rides in the cam track or groove 62 and in the illustrated position is in the neutral position since it is riding on surface 78. As the cam moves to the left in FIG. 7 relative to the follower 76, the surface 80 will lift the active blade into contact with the upper blade 72 which will be lifted from the rest or finger 70. A little further cam movement will drop the follower into the deepest portion 82 of the groove 62 permitting the active blade to now contact the lower blade.

In this arrangement as in the first embodiment the switches in any assembly will operate on alternate cam tracks while the switch assembly or array on the opposite side of the cam face will be operated by the other set of alternate cams. Thus in this arrangement essentially the same construction is provided with the passive blades referenced from a smooth portion of the program member. As in the first embodiment, the molded end fitting on the lower passive blade may include an electrical barrier 84 to minimize arc over and permit reduction in spacing between adjacent switches.

Figure 8:
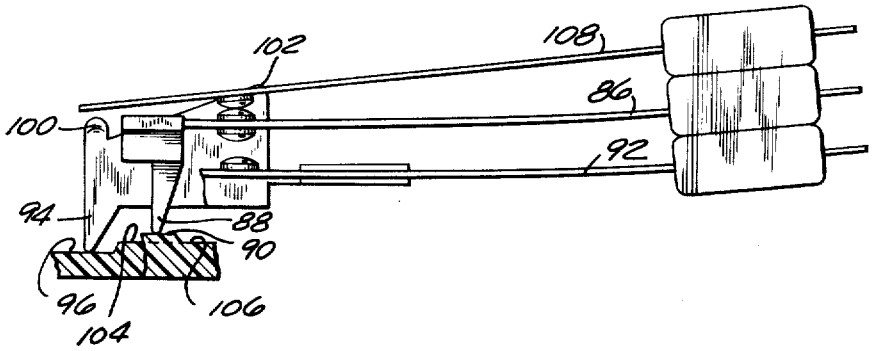
FIG. 8 is a simplified view showing a double cam track arrangement for faster switching time.

The passive blade in the embodiments thus far described is referenced relative to the smooth surface (i.e. the hub or intergroove surface) and the active blade is the only blade which is moved by a cam track. If the program cam is operated in an intermittent or step-by-step fashion and the actual step is fast, the switching time will be fast. If it is desired to apply the same concept to a creep timer or to a stepping timer in which more rapid switching time is desirable, it is possible to actuate the normally passive blade along with the active blade. This is illustrated in FIG. 8 where the active blade 86 has a follower 88 resting on the cam surface 90. The lower blade 92 has a follower 94 resting in cam track 96 and including the upwardly projecting finger 100 as well as the electrical barrier 102. Now, then, it will be apparent by reference to the drawings that during the next step the lower blade will be lifted so the follower rests on surface 104 while at the same time the active blade will drop off surface 90 down to surface 106. Thus the active blade moves down while the heretofore passive blade 92 moves up. As the blade 92 moves up, the rest 100 also moves up and the effect is to catch the upper blade 108 on its way down (following movement) while at the same time allowing the active blade 86 to drop away from the upper blade, thereby breaking the circuit rapidly. Increased switching speed can be achieved by this means to permit application of this construction to a creep-type timer whether that timer be the flat or face cam type or the drum type.

Figure 10:
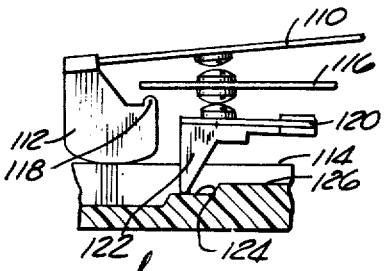
Figure 11:
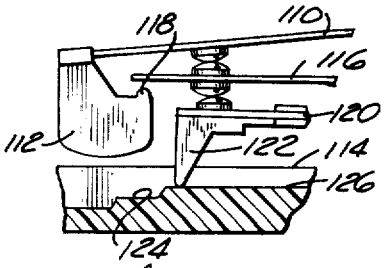

In all of the foregoing descriptions the switching action is essentially SPDT. In some instances it may only be necessary to have the switch arrangement be SPST (using only two blades). There are, however, some situations where it would be advantageous to provide a make-make action in the switching sequence. This can be provided by the construction shown in FIGS. 9, 10, and 11. Here the upper blade 110 is provided with an integral molded spacer 112 which has a curved contact or shoe portion riding on the smooth surface 114 between the cams. The bias of the upper blade 110 will hold the spacer 112 against the smooth surface 114 but due to the resiliency of the blade, the blade and its follower can be elevated when indicated. The free end of the middle blade 116 is biased against the rest or stop surface 118 on the follower. The lower blade 120 is self-biased downwardly so that the follower 122 on the end of the blade will ride in the cam groove as illustrated in these drawings.

Figure 9:
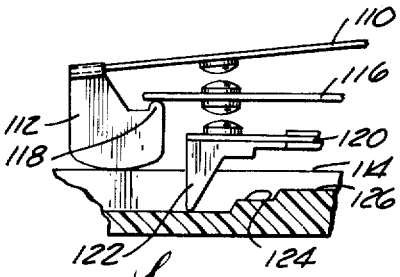
FIGS. 9–11 show the concept applied to a make-make switching arrangement.

In FIG. 9 the lower blade follower 122 is resting in the bottom track of the cam groove. There is no contact between the lower blade and the middle blade and the middle blade cannot contact the upper blade since both the middle and upper blades are restrained from further downward movement. When the lower blade follower 122 reaches the surface 124, the lower blade will be lifted into contact with the middle blade 116 and lift that blade slightly from the rest 118 so as to insure a good contact pressure. When the follower 122 is now moved up to rest on the highest cam track portion 126 the lower two blades move in unison to engage the middle blade with the top blade with enough overtravel to lift spacer 112 from the reference surface and thereby obtain proper contact pressure, this completes the make-make sequence. It will be obvious that as rotation of the cam continues, the upper pair of contacts can be opened first followed by opening of the second pair of contacts or all contacts could be opened substantially at once by having the follower 122 drop from the highest elevation 126 to the lowest in one step. While this description has been directed to application of the make-make circuit to a flat cam, it is obvious that this will work equally well in connection with a drum-type program cam.

We claim:

1. A timer including a program member rotatable about an axis and provided with spaced cams, a switch fixed relative to the program member for actuation by a cam, said switch including two blades the free ends of which are biased towards the program member, a follower *molded* on one of the blades engaging a cam whereby the cam actuates said one blade relative to the other, follower means molded on the second blade engaging the program member to reference the second blade relative to the program member *and to constrain the second blade against lateral movement.*

2. A timer according to claim 1 in which the switch includes a third blade biased towards the program member, said follower means including a stop limiting movement of the third blade towards the program member.

3. A timer according to claim 2 in which said follower means engages a separate cam on the program member for actuation thereby.

4. A timer according to claim 1 in which the switch includes a third blade, said follower means including a stop engageable by said third blade to limit movement of the third blade.

5. A timer according to claim 4 in which the first blade is actuated by the cam to first engage the third blade and upon continued motion to move the third blade from said stop into contact with the second blade.

6. A timer according to claim 4 in which the follower means engages a separate cam track on the program member whereby the second and third blades are referenced by the separate cam track while the first blade is actuated by the first named cam, said first blade being engageable with either the second or third blades and the blades moving into or out of contact may be moved in the desired direction simultaneously to increase the speed of switching.

7. A timer including a program member provided with spaced cams for operating switches and means for rotating the program member, a plurality of switches fixed relative to the program member for actuation by respective cams, each of the switches including a blade having its proximal end fixed and its distal end including a contact and spacer means *molded on the blade and* engaging the program member so as to reference the contact relative to the program member *and to constrain the blade against lateral movement,* a second blade having its proximal end fixed relative to the first blade with its distal end including a contact and a depending follower *molded on the blade and* engaging one of the cams on the program member, the second blade being self-biased to urge the follower into engagement with the cam whereby the second blade is actuated in accordance with the configuration of the cam to open and close said contacts in a programmed sequence.

8. The construction of claim 7 including means confining the follower on the second blade against lateral movement whereby the follower is kept on its associated cam.

9. A timer according to claim 7 in which the program member is flat and said cams are concentric about the center of rotation of the program member, said switches being disposed in generally tangential relationship to the cams.

10. A timer according to claim 7 in which the program member is cylindrical with the cams axially spaced along the cylinder and the switches are disposed in generally tangential relationship to the cylinder.

11. Apparatus according to claim 7 in which said spacer means engages another cam on the program member whereby both blades may be actuated by their respective cams.

12. Apparatus according to claim 7 including an electrical barrier projecting from one of the blades between it and the adjacent blades of the adjacent switch a sufficient height to electrically shield the contacts associated with the first switch from the adjacent contacts.

13. Apparatus according to claim 7 in which the distal end of the first blade is provided with an upwardly projecting stop, a third blade having its proximal end fixed relative to the first and second blades and having its distal end overlying said stop and having a contact adapted to be engaged by the second blade contact, said third blade being self-biased against said stop and movable upwardly therefrom in response to elevation of the second blade by the cam to close the second blade contact on the upper blade contact.

14. A timer according to claim 7 in which the follower on the second blade is generally disposed on the projected diameter of said program member.

15. A timer including a program member having spaced cams, an assembly of spaced switches fixed relative to the program member for actuation by the cams, each of said switches including a blade having its free end self-biased towards said program member and including a spacer *molded on the blade and* acting on the program member to reference the blade relative thereto, second blade operatively associated with the first blade in a switch and having a depending follower *molded on the blade and* biased into contact with the associated cam, contacts on said blades which are opened and closed according to the configuration of the associated cam.

16. A timer according to claim 15 in which said spacer is part of an assembly molded on the end of the first blade, said assembly including an electrically insulative barrier disposed between the contacts of said switch and the contacts of an adjacent switch.

17. A timer according to claim 15 in which each said second blade follower engages its associated cam between means limiting lateral movement of the follower.

* * * * *